Figure 1:
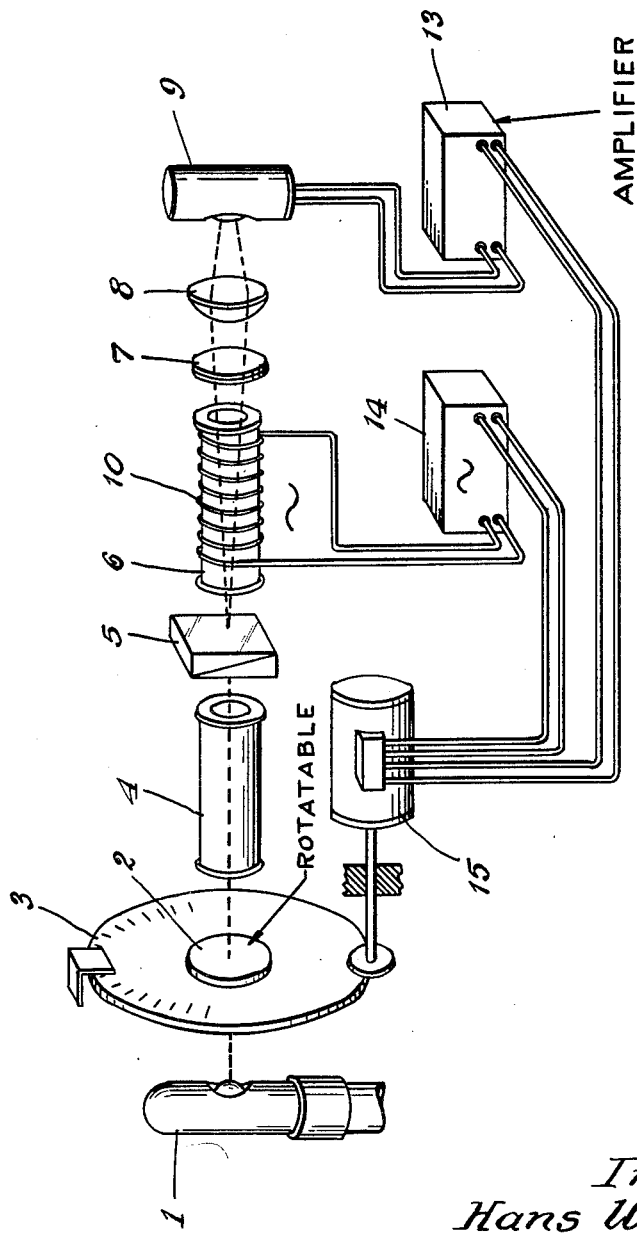

April 26, 1960  H. WENKING  2,933,972
PHOTO-ELECTRIC POLARIMETER
Filed Jan. 25, 1956  3 Sheets-Sheet 3

Inventor
Hans Wenking
by Singer, Stern & Carlberg
Attorneys

United States Patent Office 2,933,972
Patented Apr. 26, 1960

2,933,972

PHOTO-ELECTRIC POLARIMETER

Hans Wenking, Gottingen, Germany, assignor, by mesne assignments, to Carl Zeiss, Wurttemberg, Germany Application January 25, 1956, Serial No. 561,300

Claims priority, application Germany January 26, 1955

8 Claims. (Cl. 88—14)

The invention relates to a polarimeter for measuring optical rotative movements. Visual polarimeters are known in which the measuring takes place by adjusting the brightness of two areas which are placed directly adjacent each other in the viewing field to the same intensity. This method is known as penumbral compensation. The polarimeter of the present invention employs for the purpose of making the measurement a photo-electric cell which adjusts or compensates two differently azimuthal plane polarized light beams to the same intensity by means of the light-intensity variations method. The principle of said light intensity variations method is known, particularly in photo-electric polarimeters as for instance is disclosed in the German Patent No. 664,762. When the compensation is incomplete the photo-cell is excited by a periodically fluctuating light current and delivers an alternating current, which is superposed upon the direct current of the photo-cell. The device is adjusted until said alternating current has disappeared as may be indicated by a suitable measuring instrument. In the mentioned polarimeter, for instance, a Wollaston prism is disposed behind the measuring object such as an optically active liquid in a polarimeter tube, and serves for separating a beam of light, which is polarized by a polarizer arranged in front of the measuring object, into two diverging polarized fractional light beams which are polarized at right angles to each other and which then pass through a rotating analyzer. Said fractional light beams are optically combined behind the last named analyzer and directed to the photo-cell. The polarizer is rotated in such a manner that the oscillation emerging from the measuring object will bisect the angle between the directions of the oscillations of both fractional light beams behind the Wollaston prism. The compensation is complete only in this one adjustment, which is indicated by a circular scale.

The rotating analyzer requires to be well-supported either in ball bearings or in plain bearings. A ball bearing support may produce undesired vibrations, the disturbing influence of which will become noticeable in the photo-cell. Plain bearings operate substantially quieter, but the bearing surfaces require a very high degree of precision and also a very high degree of balancing of the rotating bodies. After a longer period of operation, said bearings require a particularly careful attention and such care required as a rule cannot be performed by the operator of the device because the very fine adjustments which have to be made require the service of an expert.

The above mentioned light intensity variations method requires a high degree of stability of the light source which is energized by direct current, since any light fluctuations the frequency of which lies in the neighborhood of the light intensity variations employed in the method, may disturb the indication of the measuring instrument. The requirement that the light source is free of any fluctuations necessitates a rather expensive power supply network for the light source. Only in case the speed of the rotating analyzer is relatively high as compared with the fluctuations of the light source, said fluctuations will not be noticed as disturbing. But the speed of the rotating analyzer is limited because of the above described bearing difficulties and the speed cannot be substantially increased to the degree necessary to eliminate the influence of light density fluctuations when the light source is fed from the network, without the use of expensive rectifier.

The phase of the alternating photo-electric current will change about 180° in the above described light intensity variations method when it passes the compensation point. If a voltage is produced which is in phase with the angle which the direction of the greatest permeability of the rotating analyzer, forms with a fixed zero line it is possible, by utilizing a phase-dependent rectifier to which are applied the amplified alternating photo-cell-voltage and the just mentioned alternating voltage, to determine and to indicate the direction of the adjustment. This is possible because the output voltage of the phase-rectifier will reverse the polarity when the phase of one of the voltages is shifted relative to the other voltage by 180°. Since the light current which passes through the rotating analyzer, requires a tubular rotor in the motor, it becomes extremely difficult to produce a voltage which is proportional to the azimuth of the rotating analyzer, in view of all the rotating elements.

Very high requirements are made on the rotary analyzer concerning its optical uniformity and the freedom from deviation and parallelism compounding errors of the beams of light. These high requirements are necessary because a movement of the light spot on the photo-cell in view of different sensitivity of the surface elements of the same even at a constant light current, may simulate a superimposition of an alternating light change.

Even in case of a satisfactory ray limitation inside of a rotating hollow shaft, a certain amount of stray light will strike the walls and parts of this stray light may reach the photo-cell. Because of the inhomogeneity of the inner walls, periodical stray-light-effects will be produced, which effects will simulate a disturbing alternating light even with compensation.

It is an object of the present invention to eliminate the rotating element and to produce an alternating light current of a very high frequency by adjustment of the compensation point which current will fall upon the photo-cell, so that the above described difficulties will be at once eliminated.

The present invention will be now described in the following with reference to the accompanying drawings in which:

Fig. 1 shows an embodiment of the invention or namely an optical arrangement in which the polarizer is rotatable while the analyzer is stationary and the alternating light is produced by a device, the operation of which is based upon Faraday's effect. The figure also shows an electrical arrangement suitable for the mentioned optical arrangement with means for an automatic return rotation of the polarizer.

Figure 2:
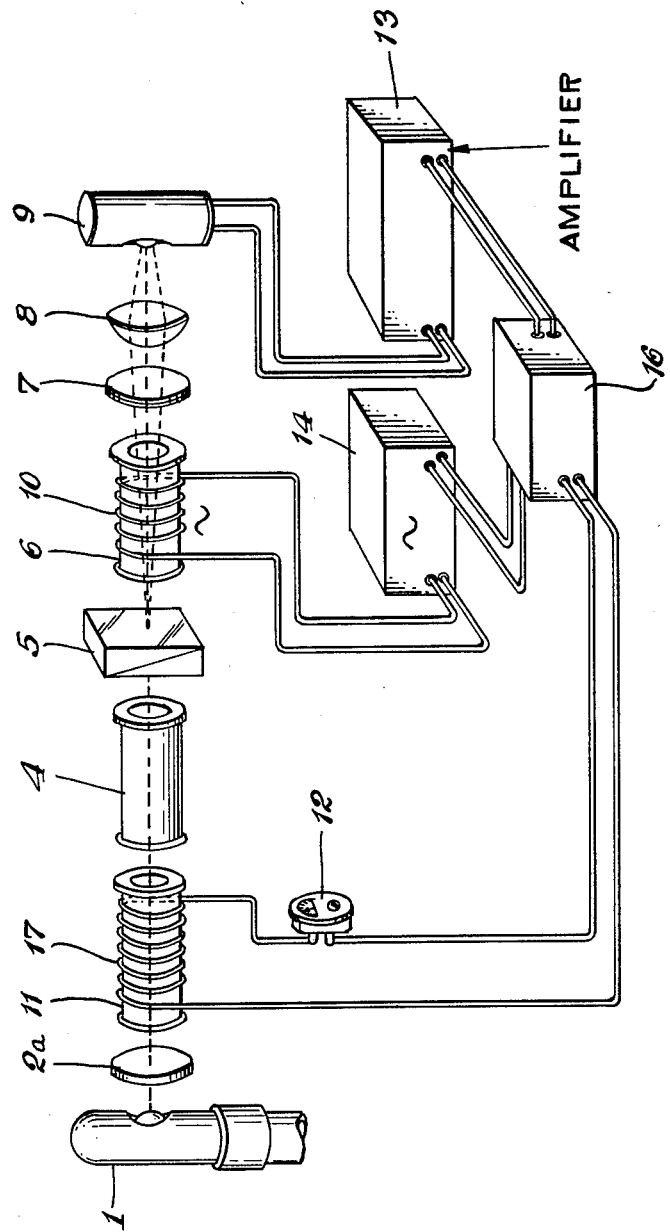

Fig. 2 shows another embodiment of an optical arrangement of the invention comprising an assembly wherein the polarizer is stationary, and a second device is provided which also employs the Faraday's effect for compensating the optical rotation in the measured object, which is disposed behind the polarizer. The electric circuit for said optical arrangement is also shown in the figure, particularly the arrangement for an automatic compensation.

Figure 3:
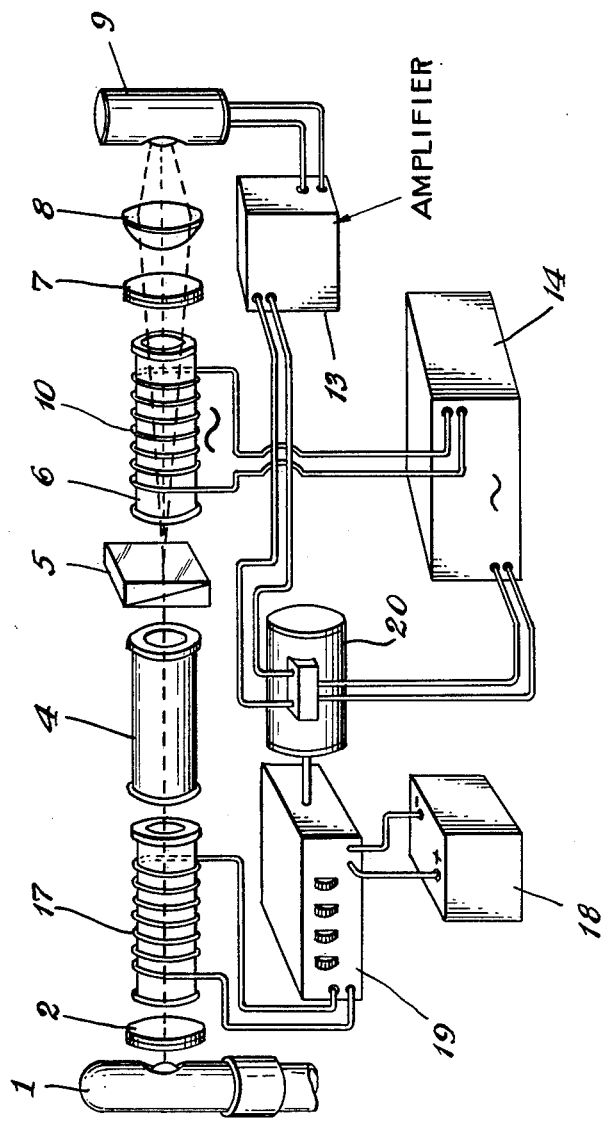

Fig. 3 shows a modified embodiment for automatically compensating the rotation in which the results of the measurement is determined by means of resistance elements.

It is in principle of no importance in the above-mentioned penumbral compensation principle whether an analyzer rotates in rear of the polarized fractional light beams or whether the oscillating planes of both fractional light beams will have equal azimuth changes when a stationary analyzer is used. Such azimuth changes can be produced in a magnetic-optical active substance before the stationary analyzer by applying a magnetic field produced by an alternating current, the lines of force of which extend in the direction of the rays (Faraday's effect). The alternating current producing said magnetic field causes a periodic change of the strength of the magnetic field in a coil and herewith the azimuths of the light oscillating planes so that the greatest sensitivity of said method can be obtained when the azimuth changes are ±45°. The azimuths of the light oscillating planes are in phase with the alternating current, which produces the magnetic field up to very high frequencies.

An embodiment of the photoelectric polarimeter according to the invention is illustrated in Fig. 1. The device contains a polarizer 2 arranged in front of the measured object 4 for plane polarizing the light, which is coming from a light source 1 and is mono-chromatically filtered. The variable oscillation direction is indicated by a circular scale 3. An optical element 5 is disposed behind the measured object 4 for separating the incident polarized light beam into two divergent polarized light beams polarized at right angles to each other. The device also contains an analyzing system 6, 7; an optical device, for instance, a lens 8 for recombining the divergent light beams in the photo cell 9. The present invention is characterized in this, that a magneto-optically active substance 6, for instance water, is disposed in front of a stationary analyzer 7, and that the substance is subjected to the action of a magnetic field produced by an alternating current energizing a coil 10. The polarizer 2 is then rotated until compensation is obtained, whereupon the adjustment of the polarizer 2 is indicated on the circular scale 3.

Another embodiment of the invention is illustrated in Fig. 2 in which the formerly rotatable polarizer 2 is replaced by a stationary polarizer 2a and is supplemented by a compensating element 11 disposed behind said polarizer 2a. The stationary polarizer 2a, of course, does not require a circular scale. The above mentioned compensating element 11 consists of a magnetic optical active substance, for instance water, which is disposed between the polarizer 2a and the measured object 4. The mentioned substance is subjected to the influence of a magnetic field produced by a controllable direct current which produces a variable magnetic field. This compensating device need not be disposed in front of the measuring object 4 (as shown in Fig. 2); it also may be arranged just as well between the measured object 4 and the optical element 5. The magnitude of the magnetic field at the moment of compensation, which is indicated by the measuring instrument 12, is a measure for the optical rotation of the measured object 4. Owing to the proportionality between the current and the rotation, the reading scale 12 can be divided into equal degrees. This possibility is particularly important when a quick adjustment of the compensation is desirable, which is not possible when a rotatable polarizer 2 is used which is manually rotated or by a motor.

The embodiment of the invention illustrated in Fig. 1 permits a further improvement in that it is possible to combine the rotative adjustment of the oscillation plane in the measured object 4 with an automatic return rotation of the polarizer 2 with the circular scale 3. In accordance with a further object of the present invention, the embodiment of Fig. 1 may be improved by amplifying the current produced in the photo-cell 9, by an amplifier 13 and feeding the amplified current into a phase depending electric motor 15. Furthermore, the alternating current which is produced by the generator 14 and produces the magnetic field in the magneto-optically active substance 6 is also fed to the motor 15. These two currents are adapted to operate the motor 15 for reversing the rotation of the polarizer 2. When the optically active measured object 4 is turned to the left or to the right, the photo-electric current changes its phase, and therefore the direction of rotation of the motor 15 also is adjusted in the direction necessary for a return rotation of the polarizer 2. The adjustment of the measuring value is fully automatic until the alternating current component of the photo-electric current practically disappears.

According to a further improvement of the present invention, as shown in Fig. 2, instead of an automatic return rotation of the polarizer 2 the following arrangement may be provided when the polarizer 2a is stationary and is supplemented by the already described magneto-optically active substance 11 in a magnetic field produced by a direct current, which can be controlled and is measured by the measuring instrument 12. An automatic compensation will take place in the magneto-optically active substance 11, when the amplified photo-electric current and the alternating current producing the magnetic field in the substance 11 are conducted into a phase-depending rectifier 16 which latter produces a direct current which can be measured by the instrument 12. Said direct current produces in a coil 17 a compensating magnetic field. Said direct current changes its polarity when the measured object 4 is turned to the left or to the right, and increases in strength until the alternating current component of the photo-electric current practically disappears. This operation can take place in a very short interval of time, for instance in $10^{-3}$ second, when the alternating current frequency for the magnetic field in the coil 10 is sufficiently high, for instance 100 kHz. It thus is possible to notice any changes in the optical activity of the measured substance 4, for instance, chemical reactions of extremely short duration.

The accuracy of this quick compensation of the device of Fig. 2 can be improved still more when according to a still further embodiment of the invention, as illustrated in Fig. 3, the direct current is adjusted by a constant independent voltage source 18 and a series of precision resistance elements 19. When the motor 20 is operated by the photo-electric current which has been amplified by the amplifier 13, it adjusts said resistance elements 19 by automatically connecting the same into the circuit, one after another. It is thus possible that the resistances 19 indicate directly the value of the rotation in angle degrees. If the above mentioned resistance elements 19 are associated each with a drum having numerals thereon, the result of the measurement can be directly read off in numerals or can be recorded by a printing device.

What I claim is:

1. In a photo electric polarimeter operating according to the light intensity variations method, a polarizer disposed between an object to be measured and a source of light for producing a plane polarized bundle of light, means for rotating the plane of polarization of said polarized bundle of light, an optical element arranged when viewed in the direction of the light radiating from said source of light in rear of said object to be measured for splitting said polarized bundle of light into two polarized fractional bundles of light polarized at right angles to each other, a photo-electric cell, and an analyzer system arranged between said optical element and said photo-electric cell, said analyzer system including a magneto-optically active substance and a stationary analyzer arranged in rear thereof, a lens for recombining said two polarized bundles of light arranged between said stationary analyzer and said photo-electric cell, and means for supplying an alternating electric current for producing a magnetic field which influences said magneto-optically active substance.

2. In a photo-electric polarimeter as claimed in claim 1, including means for automatically compensating the rotation of the plane of polarization in the measured object, said means including a phase-dependent electric motor, means for amplifying the photo-electric current and feeding the latter and said alternating electric current which produces said magnetic field which influences said magneto-optically active substance to said motor for reversely rotating said polarizer.

3. A photo-electric polarimeter as claimed in claim 1, in which for the purpose of compensating the rotation of the plane of polarization in the measured object there is disposed another magneto-optically active substance between said polarizer which is stationary and said polarizing optical element, and another means for producing a magnetic field for influencing said last mentioned magneto-optically active substance.

4. A photo-electric polarimeter as claimed in claim 3, including means for amplifying the photo-electric current, a rectifier supplied by said amplifier photo-electric current, said rectifier being also supplied with said electric current producing said first mentioned magnetic field, the direct current supplied by said rectifier energizing said magnetic field influencing said other magneto-optically active substance for automatically compensating the rotation of said plane of polarization by reversely rotating it.

5. A photo-electric polarimeter as claimed in claim 3 including for the purpose of automatically compensating the rotation of the plane of polarization in the measured object, an independent direct current source, a series of resistances connected to said direct current source, an electric motor for controlling said resistances, means for connecting said resistances to said last-named magnetic field producing means, an amplifier for said photo-electric current and means for feeding said amplified photo-electric current to said electric motor.

6. A photo-electric polarimeter as claimed in claim 3 including for the purpose of automatically compensating the rotation of the plane of polarization in the measured object, an independent direct current source, a series of resistances connected to said direct current source, an electric motor for controlling said resistances, means for connecting said resistances to said last-named magnetic field producing means, an amplifier for said photo-electric current, means for feeding said amplified photo-electric current to said electric motor, and means for connecting said means for supplying an electric current to said electric motor.

7. A photo-electric polarimeter as claimed in claim 1, in which for the purpose of compensating the rotation of the plane of polarization in the measured object there is disposed another magneto-optically active substance between said polarizer which is stationary and said polarizing optical element and another means for producing a magnetic field for influencing said last mentioned magneto-optically active substance, said last named means comprising a source of direct current.

8. In a photo-electric polarimeter operating according to the alternating light principle, a source of light, means for linearly polarizing a bundle of light emitted by said source of light and rotating the plane of polarization of said polarized bundle of light, said linearly polarizing and rotating means comprising a stationary polarizer associated with means containing a magneto-optically active substance influenced by an electrically excitable winding, an analyzer system, the substance to be measured being positioned between said linearly polarizing and rotating means and said analyzer system, and a photo-electric cell adapted to be energized by the light passing through said analyzer system, said analyzer system including another magneto-optically active substance and a stationary analyzer arranged in rear thereof, a magnet winding extending around said last mentioned magneto-optically active substance, means for supplying an electric current to said last mentioned magnet winding to produce a magnetic field influencing said last mentioned magneto-optically active substance, and means for automatically compensating the rotation of the plane of polarization in the measured object, said last mentioned means including an amplifier supplied with the electric current produced in said photo-electric cell, a rectifier supplied with said amplified photo-electric cell current and means for supplying the direct current supplied by said rectifier to said first mentioned electrically excitable winding.

References Cited in the file of this patent

UNITED STATES PATENTS

| 548,701 | Crehore | Oct. 29, 1895 |
| 1,987,441 | Hardy | Jan. 8, 1935 |
| 2,126,410 | Pineo | Aug. 9, 1938 |
| 2,351,539 | Peck | June 13, 1944 |
| 2,438,422 | Stearns et al. | Mar. 23, 1948 |
| 2,503,808 | Earl et al. | Apr. 11, 1950 |

FOREIGN PATENTS

| 664,762 | Germany | Sept. 5, 1938 |
| 715,057 | Great Britain | Sept. 8, 1954 |